United States Patent
Buenger et al.

(10) Patent No.: US 6,321,809 B1
(45) Date of Patent: Nov. 27, 2001

(54) UNIQUE RADIAL PASSENGER TIRE CONSTRUCTION FOR RAT/RLF

(75) Inventors: Jerold Robert Buenger, Hartville; Mark Henry Seloover, Clinton, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/470,337

(22) Filed: Dec. 22, 1999

(51) Int. Cl.⁷ ........................................................ B60C 9/18
(52) U.S. Cl. .............................. 152/526; 152/531; 152/533
(58) Field of Search .................................. 152/531, 533, 152/526

(56) References Cited

U.S. PATENT DOCUMENTS

| | | | |
|---|---|---|---|
| 3,667,529 | * 6/1972 | Mirtain | 152/361 |
| 3,745,084 | * 7/1973 | Schelkmann | 156/382 |
| 5,223,061 | * 6/1993 | Navaux | 152/527 |
| 5,437,321 | * 8/1995 | Breny | 152/454 |
| 5,524,688 | * 6/1996 | Trares | 152/540 |
| 5,538,060 | * 7/1996 | van der Meer | 152/209 |
| 5,580,404 | * 12/1996 | Hitzky | 152/209 |
| 5,662,751 | * 9/1997 | Creech | 152/527 |
| 5,968,295 | * 10/1999 | Khono | 152/527 |

FOREIGN PATENT DOCUMENTS 0 791 485-A1 * 8/1997 (EP) .

* cited by examiner

*Primary Examiner*—Jeff H. Aftergut
*Assistant Examiner*—Justin Fischer
(74) *Attorney, Agent, or Firm*—David E Wheeler

(57) ABSTRACT

A pneumatic tire, which may be used as a control tire for calibrating tire testing equipment, comprises a pair of annular beads (40), at least one carcass ply (15) wrapped around the beads, belt reinforcement (13,14,16) disposed over the at least one carcass ply in a crown area of the tire, a tread (12) disposed over the belt reinforcement, and sidewalls (18) disposed between the tread (12) and the beads (40), The tire is made with a tread (12) having no grooves or sipes, and which comprises a radial medium truck tire retreading compound. The belt reinforcement (17,17a,17b ) is laid up in the circumference of the tire with a low angle, i.e. less than 0.75° with respect to the EP of the tire in the second belt (14), and less than 0.5° with respect to the EP of the tire in the first belt (13,16).

9 Claims, 2 Drawing Sheets

UNIQUE RADIAL PASSENGER TIRE CONSTRUCTION FOR RAT/RLF

TECHNICAL FIELD

The invention relates to a radial passenger tire which is particularly suitable for use as a control while monitoring equipment used to measure tire properties.

BACKGROUND ART

In the tire industry, the method for continuous monitoring of flat trac type equipment and force and moment (F&M) machines comprises repeated running of the machines and applying SPC (statistical processing control) analysis methods to monitor testing repeatability. This, together with routine machine calibration checks, provides fairly repeatable and consistent results. Cross-correlation between machines run in different locations, using similar type tires, however, showed significant differences between the machines. This is not a problem for individual machines since data for a specific test tire is usually compared to a control tire that is tested on the same machine. To correlate data from one machine to another, when the need arises, correlation regession equations have been developed wherein the data from one machine can be used to predict the correlating data on another machine.

There is a need in the art to standardize, as much as possible, different machines that are used to do the same type of testing. One means to do this is to provide a control tire, which has known and/or predictable properties, that can be used as a standard on all such testing machines. Then, as much as possible, the machines can be calibrated for the known properties of the control tire. While this may not eliminate the need for correlation regression equations, the differences between the machines can be reduced.

U.S. Pat. No. 2,945,525 describes an annular layer comprising ringed shaped reinforcing elements which have at least one interruption per each circumference of the tire. The layer described in the patent is a belt layer which is the sole reinforcement of the crown area of the tire.

It is an object of this invention to provide a control tire that has known, predictable and consistent properties.

Other objects of the invention will be apparent from the following description and claims.

Definitions

"Apex" refers to a wedge of rubber placed between the carcass and the carcass turnup in the bead area of the tire, usually used to stiffen the lower sidewall of the tire.

"Axial" and "axially" means lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Carcass ply" means the tire structure apart from the belt structure, tread, undertread, sidewall rubber and the beads.

"Equatorial plane (BP)" means the plane perpendicular to the tire's axis of rotation and passing through the center of its tread.

"Pantographing" refers to the shifting of the angles of cord reinforcement in a tire when the diameter of the tire changes, e.g. during the expansion of the tire in the mold.

"Ply" means a continuous layer of rubber-coated parallel cords.

"Pneumatic tire" means a mechanical device of generally toroidal shape (usually an open torus) having beads and a tread and made of rubber, chemicals, fabric and steel or other materials. When mounted on the wheel of a motor vehicle, the tire through its tread provides a traction and contains the fluid or gaseous matter, usually air, that sustains the vehicle load.

"Radial" and "radially" means directions radially toward or away from the axis of rotation of the tire.

"Radial-ply tire" means a belted or circumferentially restricted pneumatic tire in which the ply cords which extend from bead to bead are laid at cord angles between 65 to 90 degrees with respect to the equatorial plane of the tire.

"Sidewall" means that portion of a tire between the tread and the bead.

"Splice" refers to the connection of end of two components, or the two ends of the same component in a tire. "Splice" may refer to the abutment or the overlapping of two such ends.

"Tread" means a molded rubber component which, when bonded to a tire casing, includes that portion of the tire which comes into contact with the road when the tire is normally inflated and under normal load.

SUMMARY OF THE INVENTION

A pneumatic tire comprises a pair of parallel annular beads (40), at least one carcass ply (15) wrapped around the beads, belt reinforcement (13,14,16) disposed over the at least one carcass ply in the crown area of the tire (10), tread (12) disposed over the belt reinforcement, and sidewalls (18) disposed between the tread (12) and the beads (40), wherein the belt reinforcement (13,14,16) comprises a first belt (13,16) wherein reinforcement (17,17a) in the belt has an angle of ±0.5° or less with respect to the equatorial plane (EP) of the tire, and a second spirally wound belt (14) having a pitch length of 10 mm to 15 mm wherein reinforcement (17b) in the belt (14) also has an angle which is less than ±0.75° with respect to the equatorial plane (EP) of the tire.

In a first embodiment, the tire has a first belt (13) that comprises spirally wound strips, which are wound about the circumference of the tire (10) with a pitch length of 6 mm to 10 mm. The tire is illustrated having a first belt (13) comprising 1670/2 dTex (1500/2 denier) aramid reinforcement (17).

In a second illustrated embodiment, the tire has a first belt (16) which comprises steel cord reinforcement (17a).

In the illustrated embodiment, the tire comprises two carcass plies having 1100/2 dTex (1000/2 denier) polyester reinforement and has a nylon fabric toe guard (42). The carcass ply (15) has a turnup comprising a locked bead tie-in. The tire is made with a tread (12) which is smooth.

The second belt (14) in each illustrated embodiment comprises 940/2 dTex (840/2 denier) nylon reinforcement (17b).

The tire is laid up green with precise building dimensions and tolerances very close to its cured dimensions, and is illustrated using a tread which comprises a retreading rubber formulation which is used for retreading radial medium truck tires.

DETAILED DESCRIPTION OF THE INVENTION

The tire of the invention uses materials, design, and construction features that result in structural symmetry, and demonstrates improved durability in treadwear. The structural symmetry provides lateral force and aligning moment values that theoretically should be zero, which contrast with the non zero values for conventional radial tires.

Lateral force and aligning moment are measured by averaging the clockwise and counterclockwise rotation forces and moments, respectively, at zero degree slip angle and zero degree inclination angle.

The symmetry also, theoretically, provides a tire with plysteer residual aligning torque PRAT) and plysteer residual lateral force (PRLF) which are also zero.

Figure 1:
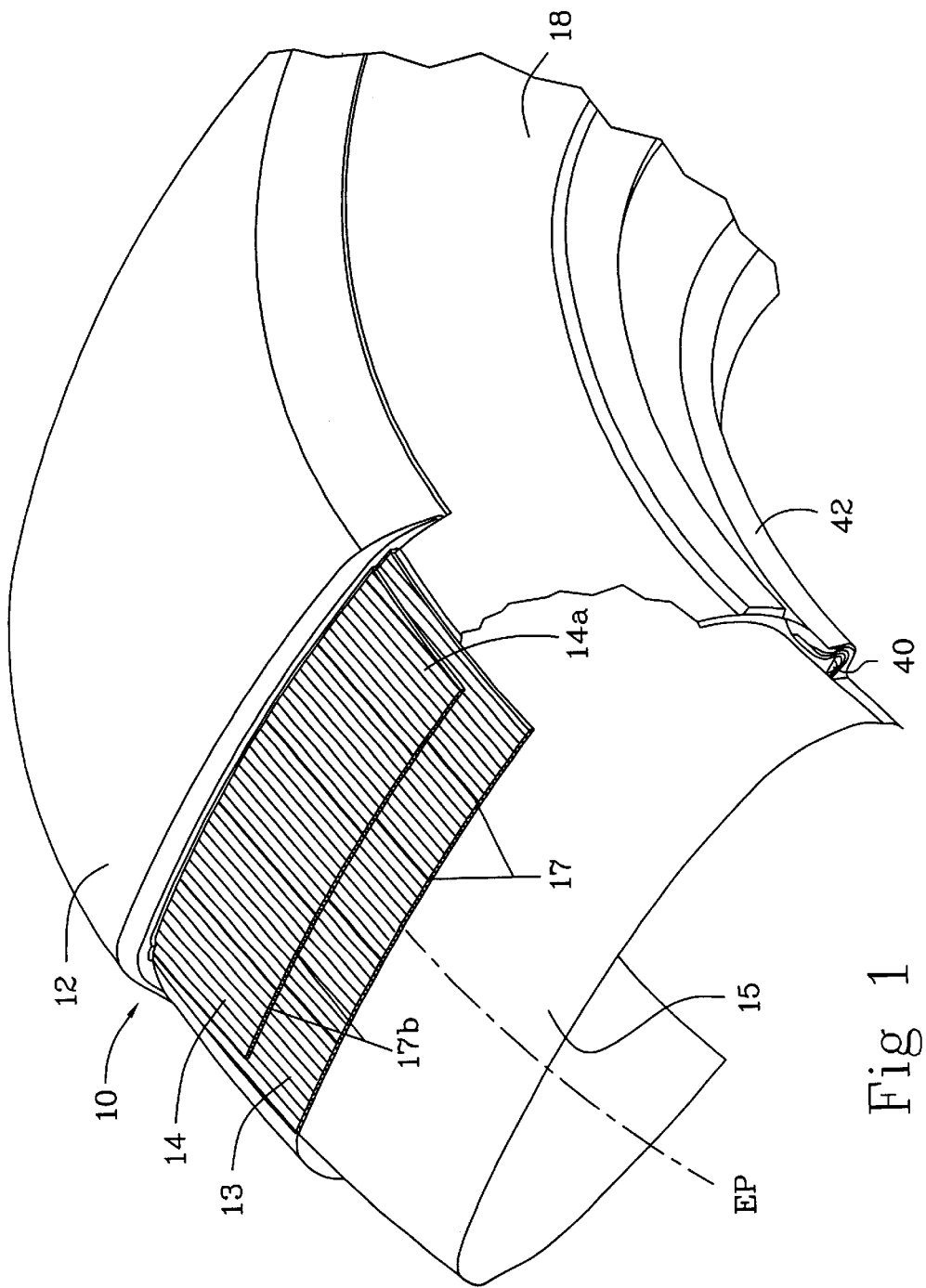
FIG. 1 illustrates a tire of the invention having two spiral belts wherein the reinforcement in the belts is at substantially zero degrees with respect to the equatorial plane (BP) of the tire.

With reference now to FIG. 1, a tire 10 of the invention has at least a pair of parallel annular beads 40 around which are wrapped at least one carcass ply 15. The tire has belts 13 and 14 disposed over carcass 15 in a crown area of the tire, and tread 12 is disposed over said belts. Sidewall 18 is disposed between tread 12 and beads 40. In the illustrated embodiment, a nylon fabric toe guard 42 is applied to the bead area of the tire.

In the illustrated embodiment of FIG. 1, first belt 13 comprises a spiral application of a reinforced strip material wherein the reinforcement 17 comprises an organic polymer. Belt 13 is laid up with a minimum pitch wherein the reinforcement in the belt has an angle of ±0.5° or less with respect to the equatorial plane (EP) of tire 10.

Second belt 14 also comprises a spiral lay up of a strip material which is reinforced with an organic polymer filament or cord wherein the reinforcement 17b is laid up with a minimum pitch, wherein the reinforcement has an angle which is ±0.75° or less with respect to the equatorial plane (EP) of the tire.

The organic polymer reinforcement used to me the reinforcement cords in the first and second belts can be the same or different and may be selected from the group comprising polyvinyl alcohols, polyesters, aromatic polyamides, amides, and reconstituted cellulose.

In the illustrated embodiment of FIG. 1, first belt 13 comprises aramid reinforcement cords which are laid up with a pitch length of about 8.3 mm with a sufficient number of turns to be equivalent to three layers of belt, wherein the coid angle with respect to the EP of the tire is less than 0.3°. The reinforcement in second belt 14 comprises nylon with a pitch length of about 12.5 mm, and is laid up in a sufficient number of turns to be equivalent to two layers of belt, wherein the reinforcement has an angle with r to the EP of the tire of less than 0.4°.

Tread 12 is made smooth, i.e. there is no tread pattern in the tread. The smooth tread helps maximize tread stiffness and minimize wear in the tire when the tire is run on test equipment, and minimizes variations in the test data. Also, the smooth tread makes it possible to build a green tire with close tolerances to the mold dimensions, since a tire with a smooth tread is easier to remove from the mold.

Nylon fabric reinforced toe guard 42 may be provided to improve the durability of the tire, since the tire is expected to undergo frequent mounting on, and dismounting from testing wheels.

Figure 2:
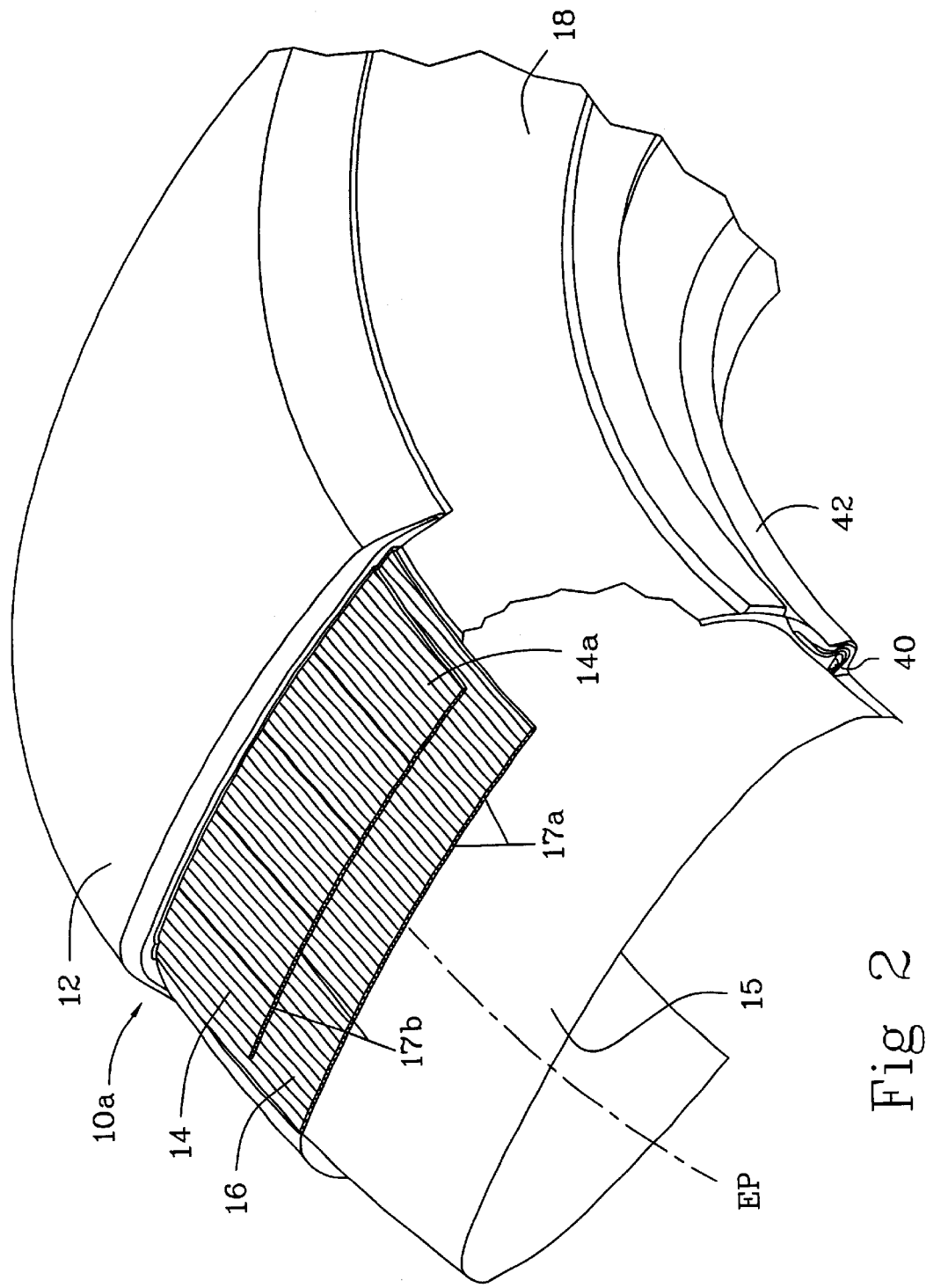
FIG. 2 illustrates a tire of the invention having one cut belt and one spiral belt wherein the reinforcement in both belts is at substantially zero degrees with respect to the EP of the tire.

With reference now to FIG. 2, in a second embodiment of the invention, tire 20 is constructed the same as tire 10 in FIG. 1, except that first belt 16 is a cut belt, and the reinforcement cords 17a in the cut belt comprise steel. Second belt 14 comprises a spirally wound strip of material which is reinforced with organic polymer filaments or cords.

Reinforcement 17a in first belt 16 is laid up having the same angles as described with respect to first belt 13 in FIG. 1. Also, reinforcement 17b in second belt 14 is laid up with the same angles as illustrated with respect to second belt 14 in FIG. 1.

The very low angles, with respect to the EP of the tire, in first belts 13, 16 and second belts 14 make it possible to use high modulus reinforcement in the construction of the tire, since there is no pantographing of the reinforcement cords in the belt when the tire is expanded in the curing mold. In addition, the dimensions of the belts in the green tire are made very close to the dimensions of the belts in a cured tire, so that the green tire can be made without the expectation of expansion of the belts. The lack of photographing is a factor making it possible for the construction of a symmetrical uniform tire since there is no distortion in the tire caused by pantographing.

In addition to the high modulus reinforcement used in the belt package, and the low angles used in the belt package, the tire is made using tread compounds that have a high abrasion resistance. In the illustrated embodiment, a retreading compound used for retreading radial medium truck tires is used to make tread 12. Sidewal compounds that are conventional for use in radial passenger tires were used to make the sidewalls 18.

The invention is further illustrated with reference to the following example.

EXAMPLE 1

A tire size P225/70R16 was made having a smooth tread (i.e. there are no grooves, sipes or any tread pattern in the tread).

The first belt was reinforced with 1670/2 dTex (1500/2 denier) aramid having a spiral application with a pitch length of about 8.3 mm to produce a circumferential wound belt equivalent to 3 layers having a reinforcement angle of less than 0.23° with respect to the EP of the tire. Reinforcement in the second belt comprised 940/2 dTex (840/2 denier) nylon, lid up in a spiral application with a pitch length of about 12.5 mm to produce a circumferential wound transition belt equivalent to 2 layers with a cord angle of less 0.34°.

The carcass comprised 2 plies reinforced with 1100/2 dTex (1000/2 denier) polyester cords. The polyester reinforcement in the carcass plies were laid up at 90° with ect to the EP of the tire and were wrapped around the beads without an apex to produce a locked bead tie-in.

Also used in the construction was a fabric toe guard comprising nylon monofilament having a linear density of 940 dtex (840 denier) at 11 e.p.c.(28 e.p.i.), encased in sidewall rubber compound.

This design makes it possible to produce a green tire with minimal circumferential growth potential at a diameter very close to the cured dimensions. Mold clearance is achieved by precise building dimensions and tolerances and by using a smooth treaded tire mold. Also, the absence of tread mold bridgework minimizing the green tire blow up factor required during shaping of the tire in the mold. The minimizing of the green tire growth makes it possible to use relatively inextensible aramid or steel belt reinforcement with a low angle of circumferential orientation.

While the invention has been specifically illustrated and described, those skilled in the art will recognize that the invention can be variously modified and practiced without departing from the spirit of the invention. The invention is limited only by the following claims.

What is claimed is:

1. A pneumatic tire comprising a pair of parallel annular beads (40), at least one carcass ply (15) wrapped about said beads, belt reinforcement (14, 13 or 16) disposed over said at least one carcass ply in a crown area of said tire (10), tread (12) disposed over said belt reinforcement, and sidewalls (18) disposed between said tread (12) and said beads (40), wherein said belt reinforcement (14, 13 or 16) comprises a first belt (13 or 16) wherein reinforcement (17 or 17*a*) in the belt has an angle of ±0.5° or less with respect to the equatorial plane (EP) of the tire, and a second spirally wound belt (14) wherein reinforcement (17*b*) in the belt (14) has an angle of ±0.75° with respect to the equatorial plane (EP) of the tire.

2. The tire of claim 1 wherein said at least one carcass ply (15) comprises two carcass plies having 1100/2 dTex (1000/2 denier) polyester reinforcement.

3. The tire of claim 2 which further comprises a nylon fabric toe guard (42).

4. The tire of claim 2 wherein the carcass ply (15) has a turnup comprising a locked bead tie-in.

5. The tire of claim 2 wherein said tread (12) is smooth.

6. The tire of claim 1 wherein said first belt (13) comprises 1670/2 dtex (1500/2 denier) aramid reinforcement (17).

7. The tire of claim 6 wherein said second belt (14) comprises 940/2 dTex (840/2 denier) nylon reinforcement (17*b*).

8. The tire of claim 1 wherein said first belt (16) comprises steel cord reinforcement (17*a*).

9. The tire of claim 8 wherein said second belt comprises 940/2 dTex (840/2 denier) nylon reinforcement.

* * * * *